(12) United States Patent
Daniel et al.

(10) Patent No.: US 10,951,708 B2
(45) Date of Patent: Mar. 16, 2021

(54) SYSTEMS AND METHODS FOR DATA ACCESS AUTHENTICATION USING SEARCHABLE ENCRYPTION

(71) Applicant: British Telecommunications Public Limited Company, London (GB)

(72) Inventors: Joshua Daniel, London (GB); Gery Ducatel, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 16/292,683

(22) Filed: Mar. 5, 2019

(65) Prior Publication Data
US 2019/0273781 A1      Sep. 5, 2019

(30) Foreign Application Priority Data
Mar. 5, 2018 (EP) .................................... 18159886

(51) Int. Cl.
*G06F 15/16* (2006.01)
*H04L 29/08* (2006.01)
(Continued)

(52) U.S. Cl.
CPC ........ *H04L 67/1097* (2013.01); *G06F 16/152* (2019.01); *G06F 16/1824* (2019.01);
(Continued)

(58) Field of Classification Search
CPC ... H04L 67/1097; H04L 9/0643; H04L 63/10; G06F 16/1824; G06F 16/9538; G06F 16/152; G06F 21/6218
(Continued)

(56) References Cited

U.S. PATENT DOCUMENTS 9,311,494 B2* 4/2016 Fujii ................. G06F 16/90335
9,537,650 B2* 1/2017 Auradkar ............ G06F 16/8373
(Continued)

OTHER PUBLICATIONS

Xiao et al., A Hybrid Scheme for Fine-Grained Search and Access Authorization in Fog Computing Environment, Apr. 6, 2017, Sensors, Sensors 2017, 17, 1423, pp. 1-22. (Year: 2017).*
(Continued)

*Primary Examiner* — Alicia Baturay
(74) *Attorney, Agent, or Firm* — Patterson Thuente Pedersen, P.A.

(57) ABSTRACT

A computer implemented method of a network connected data storage system, the method including receiving, via the network, and storing a data set including a plurality of data items encrypted using an index-based searchable encryption scheme, wherein the searchable encryption scheme has associated a server index and a client index; receiving, via the network, and storing a set of hashed information for each of a plurality of queries of the data set, each item of hashed information including a hash of a query and a hash of an expected result of executing the query using the server index; receiving, via the network, a query from a data requester to retrieve a set of data items from the data store and a hash of an expected result of executing the received query using the server index; generating a result of the received query for the data set based on the server index; and responsive to a comparison of a hash of the generated result, the received hash of the expected result, and the hashes of expected results in the set of hashed information, granting access for the requester to the data set.

8 Claims, 2 Drawing Sheets

(51) Int. Cl.
G06F 16/182 (2019.01)
G06F 16/9538 (2019.01)
G06F 16/14 (2019.01)
H04L 9/06 (2006.01)
H04L 29/06 (2006.01)
G06F 21/62 (2013.01)

(52) U.S. Cl.
CPC ...... *G06F 16/9538* (2019.01); *G06F 21/6218* (2013.01); *H04L 9/0643* (2013.01); *H04L 63/10* (2013.01)

(58) Field of Classification Search
USPC .......................................................... 709/217
See application file for complete search history.

(56) References Cited

U.S. PATENT DOCUMENTS

| | | | |
|---|---|---|---|
| 10,348,693 B2* | 7/2019 | Auradkar | ............ H04L 67/1097 |
| 2011/0145593 A1 | 6/2011 | Auradkar | |
| 2014/0331044 A1 | 11/2014 | Fujii | |
| 2018/0240191 A1* | 8/2018 | Aronson | ............ G06Q 20/3823 |

OTHER PUBLICATIONS

European Extended Search Report, Application No. 19160215.0, dated Jul. 22, 2019, 5 pages.
Song, *Forward Private Searchable Symmetric Encryption with Optimized I/O Efficiency,* Sep. 30, 2017, 15 pages.
Tahir et al., *A Ranked Searchable Encryption Scheme for Encrypted Data Hosted on the Public Cloud,* IEEE, 2017, 6 pages.
Qiang Tang, *Nothing is for Free: Security in Searching Shared & Encrypted Data,* IEEE Trans. Inf. Forensics Secur., vol. 9, No. 11, pp. 1943-1952, 2014.
Wang et al., *Secure Ranked Keyword Search over Encrypted Cloud Data,* Proc.—Int. Conf. Distrib. Comput. Syst., pp. 253-262, 2010.
Wang, *Enabling Secure and Efficient Ranked Keyword Search Over Outsourced Cloud Data,* IEEE Trans. Parallel Distrib. Syst., vol. 23, No. 8, pp. 1467-1479, 2012.
Li et al., *Security Analysis on One-to-Many Order Preserving Encryption Based Cloud Data Search,* IEEE Trans. Inf. Forensics Secur., vol. 10, No. 9, pp. 1918-1926, 2015.
B. Wang et al. "Geometric Range Search on Encrypted Spatial Data,", IEEE Trans. Inf. Forensics Secur., vol. 11, No. 4, pp. 704-719, 2016).
Bosch, "A survey of provably secure searchable encryption", ACM Comput. Surv., vol. 47, No. 2, pp. 1-51, 2014.
Curtmola, "Searchable symmetric encryption", Proc. 13th ACM Conf. Comput. Commun. Secur.—CCS '06, p. 79, 2006.
Girme, *Efficient Secure Ranked keyword search Algorithms over outsource cloud data,* International Journal of Emerging Trends & Technology in Computer Science (IJETTCS), vol. 2, Issue 5, Sep.-Oct. 2013.
Golle et al., "Secure Conjunctive Keyword Search Over Encrypted Data", Applied Cryptography and Network Security. ACNS 2004. Lecture Notes in Computer Science, vol. 3089. Springer, Berlin, Heidelberg.
Hwang et al., "Public key encryption with conjunctive keyword search and its extension to a multi-user system," vol. 4575 LNCS, pp. 2-22, 2007.
Kamara et al., "Dynamic searchable symmetric encryption," 2012 ACM Conf. Comput. Commun. Secur., pp. 965-976, 2012.
Li et al., "Fuzzy Keyword Search over Encrypted Data in Cloud Computing," 2010 Proc. IEEE INFOCOM, pp. 1-5, 2010.
Popa et al., "Multi-key searchable encryption," pp. 1-18, 2013.
Song, "Computationally efficient searchable symmetric encryption", Song et al, Workshop on Secure Data Management, SDM 2010: Secure Data Management pp. 87-100.
Troncoso-Pastoriza, "Privacy preserving error resilient dna searching through oblivious automata," Proceedings of the 14th ACM conference on Computer and communications security—CCS '07, 2007, p. 519.
Van Liesdonk et al., "Computationally efficient searchable symmetric encryption," Lect. Notes Comput. Sci. (including Subser. Lect. Notes Artif. Intell. Lect. Notes Bioinformatics), vol. 6358 LNCS, pp. 87-100, 2010.

* cited by examiner though this imposes a burden on consuming clients wishing to search the data in that the data must be entirely decrypted before it can be effectively searched. This will be the case whether the encryption is performed on a data, application, database or disk level.

SYSTEMS AND METHODS FOR DATA ACCESS AUTHENTICATION USING SEARCHABLE ENCRYPTION

CROSS-REFERENCE TO RELATED APPLICATION

The present application claims priority to EP Application No. 18159886.3 filed Mar. 5, 2018, which is hereby incorporated herein in its entirety by reference.

TECHNICAL FIELD

The present disclosure relates to methods of authentication of data access requesters.

BACKGROUND

Cloud data storage facilities come with associated trust concerns in view of uncertainty over the security and reliability of the security services available to protect data. Accordingly, it is typical for data to be encrypted for storage in the cloud, though this imposes a burden on consuming clients wishing to search the data in that the data must be entirely decrypted before it can be effectively searched. This will be the case whether the encryption is performed on a data, application, database or disk level.

A drawback of data encryption is that it can be necessary to decrypt an entire data store in order to search the data.

SUMMARY

Accordingly, it would be beneficial to overcome these drawbacks.

The present disclosure accordingly provides, in a first aspect, a computer implemented method of a network connected data storage system, the method comprising: receiving, via the network, and storing a data set including a plurality of data items encrypted using an index-based searchable encryption scheme, wherein the searchable encryption scheme has associated a server index and a client index; receiving, via the network, and storing a set of hashed information for each of a plurality of queries of the data set, each item of hashed information including a hash of a query and a hash of an expected result of executing the query using the server index; receiving, via the network, a query from a data requester to retrieve a set of data items from the data store and a hash of an expected result of executing the received query using the server index; generating a result of the received query for the data set based on the server index; and responsive to a comparison of a hash of the generated result, the received hash of the expected result, and the hashes of expected results in the set of hashed information, granting access for the requester to the data set.

In some embodiments, access is granted if an item of hashed information in the set of hashed information is identified including a hash of an expected result matching the received hash of the expected result and matching the hash of the generated result.

In some embodiments, the query received from the requester has associated an identification of a location of the server index for providing the searchable encryption scheme, and granting access is further dependent on a determination that the server index is so located at the identified location.

In some embodiments, the server index is stored in a data store separate to the data storage system.

In some embodiments, the server index is stored in an inter-planetary file system (IPFS).

In some embodiments, the identification of a location is a reference in an inter-planetary naming system (IPNS).

The present disclosure accordingly provides, in a second aspect, a computer system including a processor and memory storing computer program code for performing the method set out above.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

Embodiments of the present disclosure will now be described, by way of example only, with reference to the accompanying drawings, in which.

DETAILED DESCRIPTION

Figure 1:
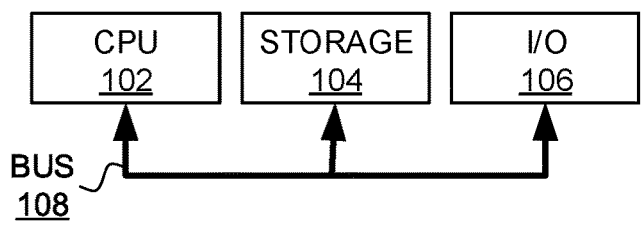
FIG. 1 is a block diagram a computer system suitable for the operation of embodiments of the present disclosure.

Storage of data by a storage service provider, such as a cloud service provider, necessarily involves deferring to the storage service provider to ensure the security of the data. A mitigation of data encryption has consequences for data search and extraction that can require the decrypting of excessive amounts of data to perform an effective search of the underlying data.

Searchable encryption provides one mechanism to address this challenge and is described in detail in the following papers: "A survey of provably secure searchable encryption" (Bosch et al., ACM Comput. Surv., vol. 47, no. 2, pp. 1-51, 2014); "Privacy preserving error resilient dna searching through oblivious automata," (J. R. Troncoso-Pastoriza, S. Katzenbeisser, and M. Celik, Proceedings of the 14th ACM conference on Computer and communications security—CCS '07, 2007, p. 519); "Computationally efficient searchable symmetric encryption" (Song et al, Workshop on Secure Data Management, SDM 2010: Secure Data Management pp 87-100); "Secure Conjunctive Keyword Search Over Encrypted Data" (Golle et al, 2004, In: Jakobsson M., Yung M., Zhou J. (eds) Applied Cryptography and Network Security. ACNS 2004. Lecture Notes in Computer Science, vol 3089. Springer, Berlin, Heidelberg); "Efficient Secure Ranked keyword search Algorithms over outsource cloud data" (Girme et al, International Journal of Emerging Trends & Technology in Computer Science (IJETTCS), Volume 2, Issue 5, September-October 2013); "Computationally efficient searchable symmetric encryption," (P. Van Liesdonk, S. Sedghi, J. Doumen, P. Hartel, and W. Jonker, Lect. Notes Comput. Sci. (including Subser. Lect. Notes Artif. Intell. Lect. Notes Bioinformatics), vol. 6358 LNCS, pp. 87-100, 2010); "Public key encryption with conjunctive keyword search and its extension to a multi-user system," (Y. H. Hwang and P. J. Lee, Lect. Notes Comput. Sci. (including Subser. Lect. Notes Artif. Intell. Lect. Notes Bioinformatics), vol. 4575 LNCS, pp. 2-22, 2007); "Secure ranked keyword search over encrypted cloud data," (C.

Wang, N. Cao, J. Li, K. Ren, and W. Lou, Proc.-Int. Conf. Distrib. Comput. Syst., pp. 253-262, 2010); "Enabling secure and efficient ranked keyword search over outsourced cloud data," (C. Wang, N. Cao, K. Ren, and W. Lou, IEEE Trans. Parallel Distrib. Syst., vol. 23, no. 8, pp. 1467-1479, 2012); "Searchable symmetric encryption," (R. Curtmola, J. Garay, S. Kamara, and R. Ostrovsky, Proc. 13th ACM Conf. Comput. Commun. Secur.—CCS '06, p. 79, 2006); "Security Analysis on One-to-Many Order Preserving Encryption-Based Cloud Data Search," (K. Li, W. Zhang, C. Yang, and N. Yu, IEEE Trans. Inf. Forensics Secur., vol. 10, no. 9, pp. 1918-1926, 2015); "Dynamic searchable symmetric encryption," (S. Kamara, C. Papamanthou, and T. Roeder, 2012 ACM Conf. Comput. Commun. Secur., pp. 965-976, 2012); "Geometric Range Search on Encrypted Spatial Data," B. Wang, S. Member, M. Li, and H. Wang, IEEE Trans. Inf. Forensics Secur., vol. 11, no. 4, pp. 704-719, 2016); "Nothing is for free: Security in searching shared and encrypted data," (Q. Tang, IEEE Trans. Inf. Forensics Secur., vol. 9, no. 11, pp. 1943-1952, 2014); "Multi-key searchable encryption," (R. Popa and N. Zeldovich, pp. 1-18, 2013); and "Fuzzy Keyword Search over Encrypted Data in Cloud Computing," (J. Li, Q. Wang, C. Wang, N. Cao, K. Ren, and W. Lou, 2010 Proc. IEEE INFOCOM, pp. 1-5, 2010).

One technique to provide searchable encryption permitting the searching of data while it is encrypted based on indices of the data is described in BT's published research "A Ranked Searchable Encryption Scheme for Encrypted Data Hosted on the Public Cloud" (Tahir, Rajarajan and Sajjad, IEEE, 2017). Any deferral of data storage responsibilities to cloud service providers requires a resilience of the cloud infrastructure against failure, attack or other threats and one way to provide this resilience is to allow replication of storage across multiple sites. This introduces a further challenge to provide a corresponding degree of resilience, reliability and assurance of access control measures across all, potentially changing, storage sites, locations and data centers.

Embodiments of the present disclosure employ searchable encryption to provide an authorization mechanism within a data access request process. In particular, in embodiments of the present disclosure the searchable encryption methodology is supplemented such that a data requester proves its authorization to access data as part of its data retrieval request, the proof being verifiable by the cloud service provider. The proof is based on a hash of the expected results of the data retrieval request derived by the requester from a client-side private index generated when the data was stored. The cloud provider verifies the hash based on performance of the actual search using a server-side index. Verification of the hash is deemed sufficient to confirm access permission by the requesting client.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
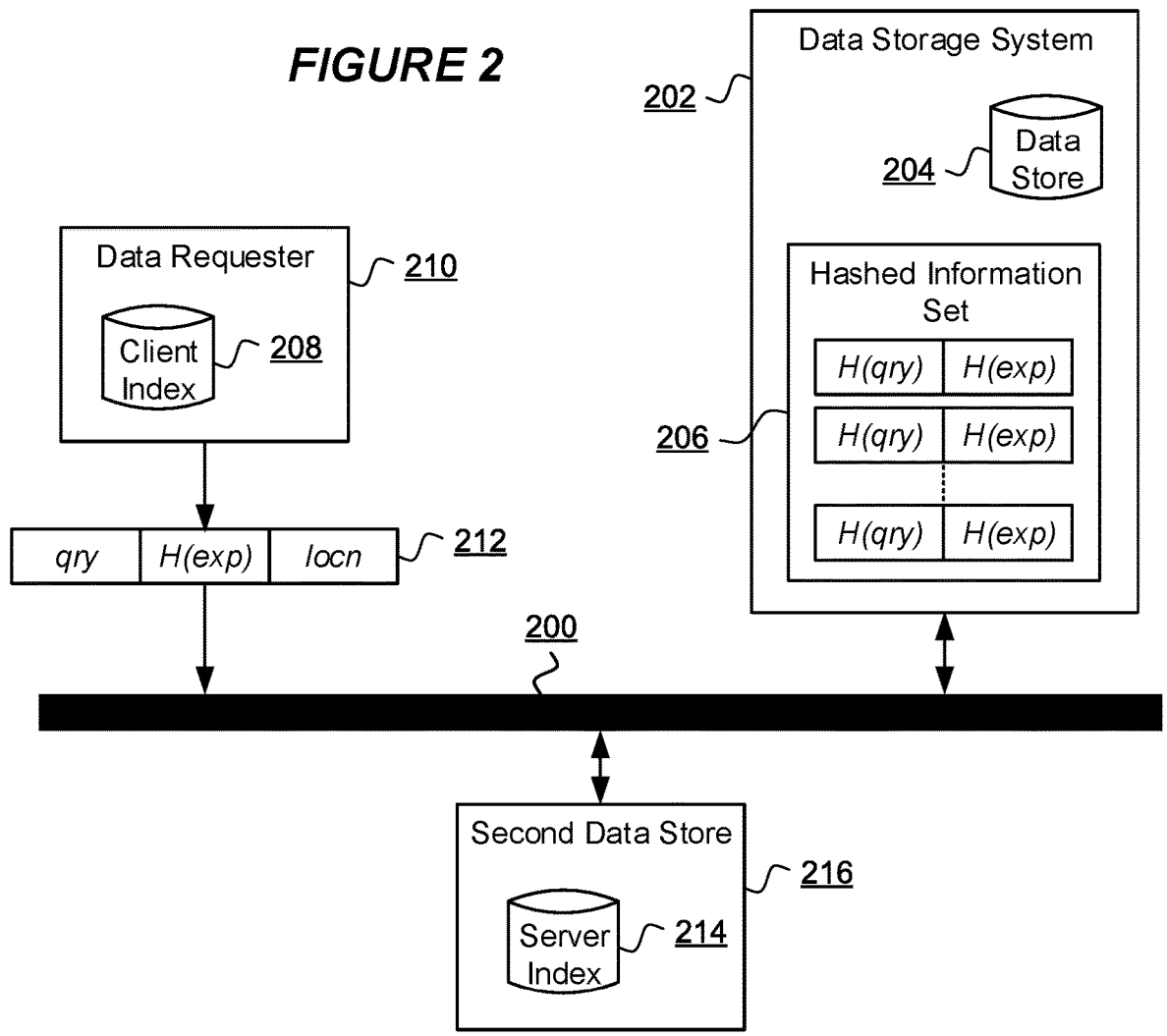
FIG. 2 is a component diagram of an arrangement for storing data in a network connected data storage system according to embodiments of the present disclosure.

FIG. 2 is a component diagram of an arrangement for storing data in a network connected data storage system 202 according to embodiments of the present disclosure. The arrangement of FIG. 2 includes a network 200 such as a wired, wireless or combination network or collection of networks providing intercommunication between a data requester 210, a data storage system 202 and, optionally, a second data store 216. The data storage system 202 is a hardware, software, firmware or combination component, whether physical or wholly or partly virtualized, arranged to provide data storage services for clients via the network 200. For example, the data storage system 202 is one or more of, inter alia: a cloud storage service; a virtualized computing system; a centralized, shared or managed service; and the like. Thus, the data storage system 202 primarily provides data storage through storage means such as physical, virtual or combination data stores 204 including any direct access, random access, sequential access or other data storage means not limited to any particular data storage technology. The data store 204 can additionally or alternatively include a database such as a relational database.

Data for storage in the data storage system 202 originates from and/or is owned by a separate component external to the data storage system 202 and in communication with the data storage system 202 via the network 200. In the present description, the data source and owner of data for storage in the data storage system 202 is the data requester 210 described below, though it will be apparent to those skilled in the art that a separate component could be so used.

The data requester 210 is a hardware, software, firmware or combination component, whether physical or wholly or partly virtualized, for accessing data stored in the data storage system 202. In the present description the data requester 210 is also the owner and originator of data stored in the data storage system 202. The data requester 210 initially triggers the generation of an index-based searchable encryption scheme for a data set for storage in the data storage system 202. Such an encryption scheme can be arranged in accordance with the disclosure in "A Ranked Searchable Encryption Scheme for Encrypted Data Hosted on the Public Cloud" (Tahir, Rajarajan and Sajjad, IEEE, 2017), or any suitable index-based searchable encryption scheme such as those described in the aforementioned publications. Such an index-based searchable encryption scheme for the data set includes a client index 208 and a server index 214 as will be known to those skilled in the art. The server index 214 includes sufficient information for the data storage system 202 to search an encrypted data store 204 in accordance with a search query to identify a search result, as will be apparent to those skilled in the art.

In one embodiment, the server index 214 is stored by a second data store 216 as a hardware, software, firmware or combination component, whether physical or wholly or partly virtualized, communicatively connected to the data storage system 202 via the network 200. In such embodiments, the second data store 216 and/or server index 214 is identifiable by an identification of a location of the server index 214 for accessing the server index 214. For example, the second data store 216 can be an inter-planetary file system (IPFS) and the identification of a location of the server index 214 can be a reference in an inter-planetary naming system (IPNS).

In use, according to one embodiment, the data requester 210 provides the data set encrypted using the index-based searchable encryption scheme to the data storage system 202 for storage in the data store 204. Additionally, the data requester 210 provides a hashed information set 206 for storing by the data storage system 202. The hashed information set 206 is a set of hashed information for each of a plurality of queries of the data set each element in the set including: a hash of a query (H(qry)); and a hash of an expected result of executing the query using the server index 216 (H(exp)). The queries in the hashed information set 206 does not include an exhaustive set of all possible queries of the data set stored in the data store 204 (for this may not be practical). Rather, the hashed information set 206 includes a set of queries selected by the data requester 210. The selection may be random.

Subsequently, the data requester 210 seeks access to the data set stored in the data store 204 via the network. As described in the present embodiment, the data requester 210 is the same data requester 210 as populated the data store 204 and generated the hashed information set 206, though it will be appreciated that, in other embodiments, a separate component could have undertaken those tasks. In any event, the data requester 210 has access to the hashed information set 206 and the client index 208. The data requester 210 seeks authorization to access the data set in the data store 204 by sending a data item 212 to the data storage system 202 including a query (qry) corresponding to a query for which a hash is included in the hashed information set 206, a hash of the expected result of the query (H(exp)) that will also be present in the hashed information set 206, and optionally (where the server index 214 is located other than at the data storage system 202) a location of the server index 214, such as an IPNS reference or address for the server index 214. Notably, the hash of the expected result of the query (H(exp)) in the data item 212 is available to the requester 210 either by prior knowledge of the hashed information set 206 as provided to the data storage system 202 generated based on the server index 214, or (where the requester 210 is not the data set originator and/or owner) from the data set originator and/or owner which initially generated and supplied the hashed information set 206.

Where the data requester 210 is authorized to access the data set in the data store 204, the hash of the expected result of the query in data item 212 will be found in the hashed information set 206. Furthermore, where the data requester 210 is so authorized, the hash of the expected result of the query in the data item 212 will match a hash of an actual result determined by the data storage system 202 by executing the query using the server index 214. Yet further, where the server index 214 is not collocated with the data storage system 202, the identification of a location of the server index 214 in the data item 212 will provide a server index 214 on which basis such a query result with matching hash can be generated (i.e. the correct server index 214). In this way, the data storage system 202 is operable to determine a state of authorization of the data requester 210 by comparison of the hashes of the expected results in the data item 212 and the hashed information set 206 with a hash of the actual result of undertaking the query based on the server index 214. Only where the data requester 210 has knowledge of the expected result derived from prior knowledge of the hashed information set 206 and the server index 214 can the requester 210 prove its entitlement. Similarly, where there is a mismatch in the hashed result and the hashed expected results, the data storage system 202 can deny access to the data set in the date store 204 for the requester 210.

Figure 3:
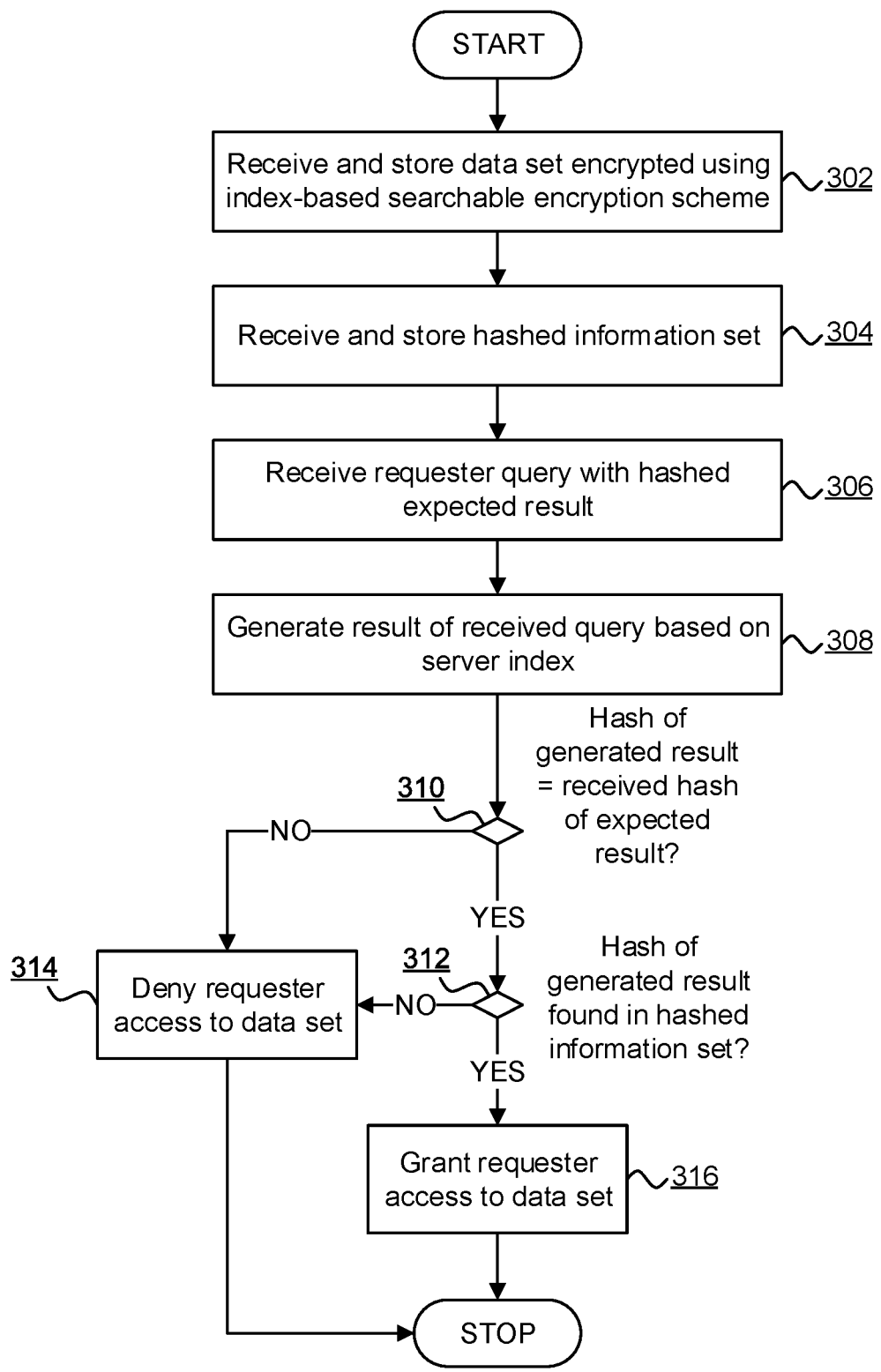
FIG. 3 is a flowchart of a method of a network connected data storage system in accordance with embodiments of the present disclosure.

FIG. 3 is a flowchart of a method of a network connected data storage system 202 in accordance with embodiments of the present disclosure. Initially, at 302 the data storage system 202 receives, via the network 200, a data set including a plurality of data items encrypted using an index-based searchable encryption scheme. The data set is stored to the data store 204. At 304 the data storage system 202 receives, via the network, and stores the set of hashed information 206 for each of a plurality of queries of the data set. At 306 the data storage system 202 receives, via the network, a query from the data requester 210 to retrieve a set of data items from the data store 204 and a hash of an expected result of executing the received query using the server index. In one embodiment, the data storage system 202 further receives an identification of a location of the server index 214 from the requester 210. At 308 the data storage system 202 generates a result of the received query for the data set based on the server index 214. At 310 the method determines if a hash of the generated result matches the hash of the expected result received from the requester 210. If it does, then the method determines, at 312, if the hash of the generated result is found in the hashed information set 206. Where it is found in the hashed information set 206 there can be a further check that a hash of the query received from the requester 210 matches a query hash associated with the hashed expected result in the hashed information set 206. Where the checks at 310 and 312 are determined in the positive, then access to the data set by the requester 210 is granted at 316. Where either of the checks at 310 or 312 is determined in the negative, then access to the data set by the requester 210 is denied at 314.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the invention. The scope of the present invention includes any novel features or combination of features disclosed herein. The applicant hereby gives notice that new claims may be formulated to such features or combination of features during prosecution of this application or of any such further applications derived there from. In particular, with reference to the appended claims, features from dependent claims may be combined with those of the independent claims and features from respective independent claims may be combined in any appropriate manner and not merely in the specific combinations enumerated in the claims.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A computer implemented method of a network connected data storage system, the method comprising:
   receiving, via a network, and storing a data set including a plurality of data items encrypted using an index-based searchable encryption scheme, wherein the index-based searchable encryption scheme has associated a server index and a client index;
   receiving, via the network, and storing a set of hashed information for each of a plurality of queries of the data set, each item of the set of hashed information including a hash of a query and a hash of an expected result of executing the query using the server index;
   receiving, via the network, a query from a data requester to retrieve a set of data items from the network connected data storage system and a hash of an expected result of executing the received query using the server index;
   generating a result of the received query for the data set based on the server index; and
   responsive to a comparison of a hash of the generated result, the received hash of the expected result, and the hashes of expected results in the set of hashed information, granting access for the data requester to the data set.

2. The method of claim 1, wherein access is granted if an item of hashed information in the set of hashed information is identified including a hash of an expected result matching the received hash of the expected result and matching the hash of the generated result.

3. The method of claim 1, wherein the query received from the data requester has associated an identification of a location of the server index for providing the searchable encryption scheme, and granting access is further dependent on a determination that the server index is so located at the identified location.

4. The method of claim 3, wherein the server index is stored in a data store separate from the data storage system.

5. The method of claim 4, wherein the server index is stored in an inter-planetary file system (IPFS).

6. The method of claim 5, wherein the identification of a location is a reference in an inter-planetary naming system (IPNS).

7. A non-transitory computer program element comprising computer program code to, when loaded into a computer system and executed thereon, cause the computer system to perform the method as claimed in claim 1.

8. A computer system comprising:
   a processor and memory storing computer program code for:
      receiving, via a network, and storing a data set including a plurality of data items encrypted using an index-based searchable encryption scheme, wherein the index-based searchable encryption scheme has associated a server index and a client index;
      receiving, via the network, and storing a set of hashed information for each of a plurality of queries of the data set, each item of the set of hashed information including a hash of a query and a hash of an expected result of executing the query using the server index;
      receiving, via the network, a query from a data requester to retrieve a set of data items from the network connected data storage system and a hash of an expected result of executing the received query using the server index;
   generating a result of the received query for the data set based on the server index; and
   responsive to a comparison of a hash of the generated result, the received hash of the expected result, and the hashes of expected results in the set of hashed information, granting access for the data requester to the data set.

* * * * *